United States Patent [19]

Yagihashi et al.

[11] Patent Number: 5,584,997

[45] Date of Patent: Dec. 17, 1996

[54] SEPARATION MODULE AND BUNDLE UNIT OF HOLLOW THREAD-TYPE POROUS MEMBRANE ELEMENTS AND METHODS OF PRODUCING SAME

[75] Inventors: Tamotsu Yagihashi, Maoka; Tsutomu Araki, Iwase-machi; Kazuyoshi Tukamoto, Oyama, all of Japan

[73] Assignee: Tsuchiya Mfg. Co., Ltd., Tokyo, Japan

[21] Appl. No.: 299,417

[22] Filed: Sep. 1, 1994

[30] Foreign Application Priority Data

Sep. 2, 1993 [JP] Japan ................... 5-218917

[51] Int. Cl.[6] .................................. B01D 63/00
[52] U.S. Cl. ................. 210/321.79; 210/321.88; 210/321.89; 210/497.1; 264/DIG. 48; 96/10; 96/11
[58] Field of Search .............. 210/500.23, 321.78, 210/321.79, 321.88, 321.8, 321.89, 497.1, 500.34, 500.38, 500.25; 264/DIG. 48; 428/376, 394; 156/155, 296; 96/10, 11

[56] References Cited

U.S. PATENT DOCUMENTS

| 3,993,816 | 11/1976 | Baudet et al. | 210/500.23 |
|---|---|---|---|
| 4,172,794 | 10/1979 | Sigdell | 210/321.89 |
| 4,668,401 | 5/1987 | Okumura et al. | 210/456 |
| 4,770,778 | 9/1988 | Yokoyama et al. | 210/500.23 |
| 5,032,269 | 7/1991 | Wollbeck et al. | 10/500.23 |
| 5,225,079 | 7/1993 | Saito et al. | 210/500.23 |
| 5,228,991 | 7/1993 | Strohmet et al. | 210/500.23 |
| 5,286,324 | 2/1994 | Kawai et al. | 156/155 |
| 5,380,433 | 1/1995 | Etienne et al. | 210/500.23 |

FOREIGN PATENT DOCUMENTS

| 1-293105 | 11/1989 | Japan. |
|---|---|---|
| 4-63117 | 2/1992 | Japan. |

Primary Examiner—Ana Fortuna
Attorney, Agent, or Firm—Foley & Lardner

[57] ABSTRACT

A separation module to be used for separation and filtration of micro-substances. The separation module comprises a bundled configuration of a plurality of hollow thread-type porous membrane elements made of high polymer material. The bundled configuration is sealingly disposed in a casing, in which the thread-type porous membrane elements are bound each other by means of molten thermoplastic resin. Such a separation module is produced by arranging the hollow thread-type porous membrane elements in a planar state; putting at least one of opposite end sections of the planar state porous membrane elements between first and second elongate thermoplastic resin films to form a sheet-like configuration; heating the sheet-like configuration to weld the films to each other and/or to the porous membrane elements; rolling up the welded sheet-like configuration in a longitudinal direction of the first and second thermoplastic films to form a rolled-up configuration in which two layers of the porous membrane elements are spirally wound, each layer being planar and including the parallelly arranged porous membrane elements; inserting the rolled-up configuration into the casing; and melting the first and second thermoplastic resin films to bind the end sections of the porous membrane elements to each other and to an inner wall of the casing.

16 Claims, 6 Drawing Sheets

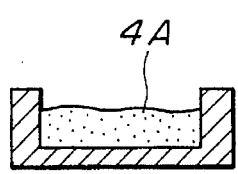
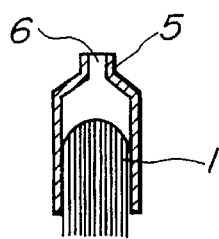
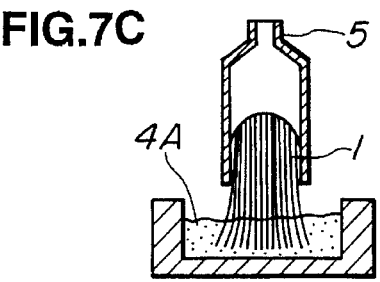
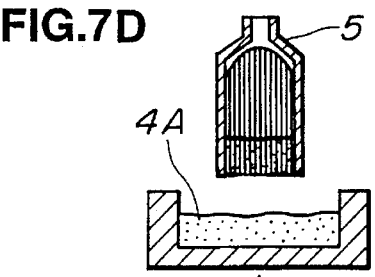
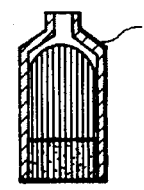
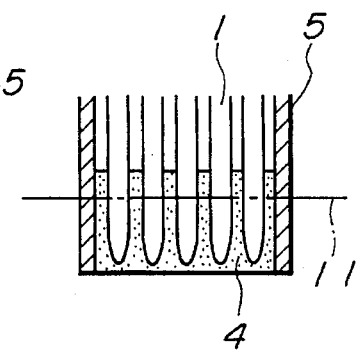
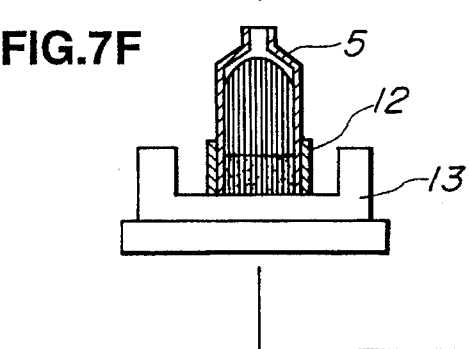
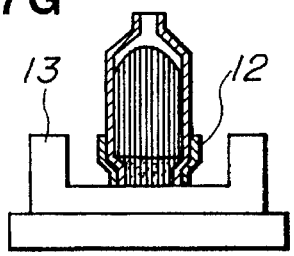
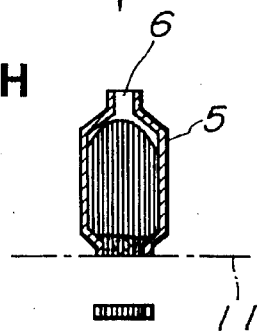
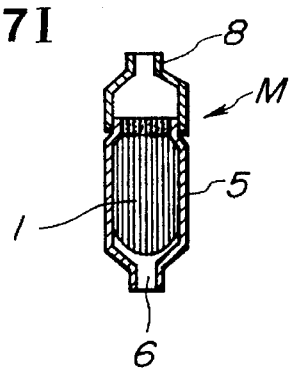
FIG.7A  FIG.7B  FIG.7C  FIG.7D  FIG.7E  FIG.7E′  FIG.7F  FIG.7G  FIG.7H  FIG.7I

SEPARATION MODULE AND BUNDLE UNIT OF HOLLOW THREAD-TYPE POROUS MEMBRANE ELEMENTS AND METHODS OF PRODUCING SAME

BACKGROUND OF THE INVENTION

1. Field of the Invention

This invention relates to improvements in a separation module and a bundle unit of hollow thread-type porous membrane elements and methods of producing the sames, and more particularly to such producing methods as to radially uniformly distribute the hollow thread-type porous membrane elements in the separation module and in the bundle unit to improve a separation efficiency of a separation module.

2. Description of the Prior Art

Separation modules of hollow thread-type porous membrane elements have been extensively used to separate or filter substances in the fields of electronic industry, food industry, medicine industry which require to the separation modules a low solubility and a high resistance to chemicals and steam during sterilization, because the porous membrane elements are made of high polymer materials. A typical separation module includes many U-shaped hollow thread-type porous membrane elements which are bundled and inserted in a cylindrical casing in such a manner that the porous membrane elements are bound to each other at their free end sections and fixed to the inner wall of the casing by using adhesive of polyurethane resin, epoxy resin or the like. The free end sections of the bundied porous membrane elements remain opened thereby allowing fluid to pass therethrough. With such a separation module, fluid to be filtered or to be subjected to separation passes through micro-pores formed in a generally cylindrical wall of each porous membrane element and flows through the above-mentioned open free end section of each porous membrane element to be discharged from the separation module.

In such a separation module, the hollow thread-type porous membrane elements are merely bundled randomly, and therefore clearances among adjacent thread-type porous membrane elements tend to be not uniform. This causes a so-called channel phenomena in which fluid to be treated flows concentrically through a location or passage having a low flow resistance during treatment of the fluid. Under this phenomena, there exit dead spaces or channels which do not function of separation or filtration, thus lowering a separating or filtering efficiency of the separation modules of the hollow thread-type porous membrane elements. In order to improve the separation modules in view of the above problems, it has been proposed to blow air from a direction to an end face of the bundled porous membrane elements. However, this method is insufficient to uniformly distribute the porous membrane elements so as to be not only difficult to provide high quality separation modules but also provide a disadvantage to damage the porous membrane elements.

Additionally, since the adhesive such as polyurethane resin or epoxy resin is used to fix the bundled hollow membrane elements in the casing, there are much dissolved substances from the adhesive, and low in resistance to heat and chemicals. As a result, the separation module have fitted to only a limited use such as water purification. In place of such a method of using adhesive, there is welding or melting method in which thermoplastic resin is filled in clearances among the adjacent hollow thread-type porous membrane elements, and then the thermoplastic resin is molten under heating to bind the porous membrane elements to each other. However, in such a method, it is difficult to maintain the generally cylindrical shape of each hollow thread-type porous membrane element during melting of the thermoplastic resin under heating, thereby raising problems in which the porous membrane elements are broken while changing the inner and outer diameters of each hollow thread-type porous membrane element.

In view of the above, the following production method of the separation modules has been proposed and is disclosed in Japanese Patent Provisional Publication No. 1-293105: First, the inside of each thread-type porous membrane element is filled with a filler material which exhibits a fluidity during heating to melt thermoplastic resin, and then the thermoplastic resin is filled to clearances among the porous membrane elements. Thereafter, heating is made to melt the thermoplastic resin thereby to bind the porous membrane elements to each other. Finally, the filler material is removed from the inside of each porous membrane element. More specifically, a thermally contractible tape is wound on the outer peripheral surface of a bundled body of the thread-type porous membrane elements with an auxiliary member filled among the porous membrane elements. As a result, the molten auxiliary member can fill the clearances among the porous membrane elements while the bundled body of the porous membrane elements are clinched under the contraction of the thermally contractible tape, thereby obtaining a fluid-tight seal among the porous membrane elements.

However, in the separation module made by this production method, it is required to make an operation of winding the tape around the bundled body of the porous membrane elements. Additionally, since the tape is freely wound, the outer diameter of the bundled body with the tape cannot become constant or take a predetermined value throughout many products. The bundled body with the tape is used, as a separation or filtering element, to be disposed in a casing, and therefore an O-ring or a packing is required between the outer peripheral surface of the separation element and the inner peripheral surface of the casing, or otherwise the auxiliary member is again required to be filled and molten therebetween. Consequently, in case of using the packing or the like, this separation module has encountered the problems of liquation of the material of the packing into the liquid to be subjected to separation, and a low sealing ability between the packing and the bundled body of the porous membrane elements owing to non-uniform outer diameters of the bundled body of the porous membrane elements (or products). In case of using again the auxiliary member, the separation module has encountered problems of failed binding of the outer peripheral portion of the bundled body, a failed sealing due to remelting of the auxiliary member which has been previously filled and molten among the porous membrane elements, and an increased seep number in the production process.

Another production method has been proposed and is disclosed in Japanese Patent Provisional Publication No. 4-63117 in which a separation unit of hollow thread-type porous membrane elements is produced by using polyolefin resin as the material of the porous membrane elements and of a sealing material for binding the end sections of the porous membrane elements. The production method is as follows: First, a suspension liquid of polyolefin resin fine powder (the sealing material) is prepared. The end sections of bundled porous membrane elements are dipped in the suspension liquid. Then, the liquid of the suspension is evaporated while putting the polyolefine resin fine powder in a molten state under heating at a temperature higher than the melting point of the sealing material. Thereafter, slow cooling is made to an ordinary temperature thereby to solidify the sealing material. In this production method, no operation of filling the spaces in the sealing material fine power is made at the step of heating, and therefore much bubbles remain in the sealing material. As a result, the separation module produced by this method is low in initial sealing ability and in durability particularly at a high temperature condition and at a condition in which a pressure is repeatedly applied.

SUMMARY OF THE INVENTION

It is an object of the present invention to provide improved separation module and bundle unit of hollow thread-type porous membrane elements, and improved production methods thereof, by which drawbacks encountered in conventional techniques can be effectively overcome without complicating a production process and without increasing a production cost.

Another object of the present invention is to provide improved separation module and bundle unit of hollow thread-type porous membrane elements, and improved production methods thereof, by which hollow thread-type porous membrane elements are uniformly dispersed in a casing thereby obtaining a high separation or filtering efficiency, while omitting problems of liquation of adhesive.

An aspect of the present invention resides in a bundle unit of hollow thread-type porous membrane elements. The bundle unit comprises a plurality of hollow thread-type porous membrane elements made of high polymer material and extending generally straight and parallel to have a high density of the porous membrane elements so as to form a bundled configuration. Thermoplastic resin is provided to bind the end sections of the porous membrane elements to each other at at least one of opposite end sections of the bundled configuration to obtain a fluid-tight seal of the at least one end section. Means are provided to form the porous membrane elements into parallelly wound two layers each of which is planar and includes the parallelly arranged porous membrane elements.

Another aspect of the present invention resides in a bundle unit of hollow thread-type porous membrane elements. The bundle unit comprises a plurality of hollow thread-type porous membrane elements made of high polymer material and extending generally straight and parallel to have a high density of the porous membrane elements so as to form a bundled configuration. Means are provided to bind the end sections of the porous membrane elements to each other at at least one of opposite end sections of the bundled configuration to obtain a fluid-tight seal of the at least one end section. The bundle unit is produced by arranging the hollow thread-type porous membrane elements in a planar state; putting at least one of opposite end sections of the planar state porous membrane elements between first and second elongate thermoplastic resin films to form a sheet-like configuration, the thermoplastic resin films constituting the binding means; heating the sheet-like configuration to weld he films to each other and to the porous membrane elements; rolling up the welded sheet-like configuration in a longitudinal direction of the first and second thermoplastic films to form a rolled-up configuration in which two layers of the porous membrane elements are spirally wound, each layer being planar and including the parallelly arranged porous membrane elements; melting the first and second thermoplastic resin films to bind the end sections of the porous membrane elements to each other.

A further aspect of the present invention resides in a separation module comprising a generally cylindrical casing. A plurality of hollow thread-type porous membrane elements are made of high polymer material and extend generally straight and parallel to have a high density of the porous membrane elements so as to form a bundled configuration, the bundled configuration being disposed in the casing. Means is provided to bind the end sections of the porous membrane elements to each other at at least one of opposite end sections of the bundled configuration to obtain a fluid-tight seal of the at least one end section. The separation module being produced by arranging the hollow thread-type porous membrane elements in a planar state; putting at least one of opposite end sections of the planar state porous membrane elements between first and second elongate thermoplastic resin films to form a sheet-like configuration; heating the sheet-like configuration to weld the films to each other and/or to the porous membrane elements; rolling up the welded sheet-like configuration in a longitudinal direction of the first and second thermoplastic films to form a rolled-up configuration in which two layers of the porous membrane elements are spirally wound, each layer being planar and including the parallelly arranged porous membrane elements; inserting the rolled-up configuration into the casing; and melting the first and second thermoplastic resin films to bind the end sections of the porous membrane elements to each other and to an inner wall of the casing.

A still further aspect of the present invention resides in a method for producing a bundle unit of hollow thread-type porous membrane elements. The method comprises the following steps in the sequence set forth: setting at least first elongate thermoplastic resin film on a core member; winding spirally a hollow thread-type porous membrane element on the core member in a manner to be generally perpendicular to the longitudinal axis of the thermoplastic resin film in plan; putting a second elongate thermoplastic resin film on the first thermoplastic resin film in a manner that parts of the porous membrane element is put between the first and second thermoplastic resin films; welding the first and second thermoplastic resin films to each other and to the parts of the porous membrane element to fix the parts of the porous membrane element so as to form a helical configuration; removing the helical configuration from the core member; bending the welded first and second thermoplastic film along its longitudinal center axis in a manner that the bent counterparts are brought into contact with each other so as to form a sheet-like configuration in which two layers of the parts of the porous membrane element are overlapped each other; rolling up the sheet-like configuration in the longitudinal direction of the thermoplastic film so as to form a rolled-up configuration; fitting a tightening member around an end section of the rolled-up configuration to apply a tightening force to the end section; heating the end section of the rolled-up configuration to melt it, in which the end section is tightened by the tightening member so as to tightly bind end portions of the parts of the porous membrane element to each other; and cutting off a tip end portion of the rolled-up configuration.

A still further aspect of the present invention resides in a method for producing a separation module of hollow thread-type porous membrane elements. The method comprises the following steps in the sequence set forth: setting at least first elongate thermoplastic resin film on a core member; winding spirally a hollow thread-type porous membrane element on the core member in a manner to be generally perpendicular to the longitudinal axis of the thermoplastic resin film in plan; putting a second elongate thermoplastic resin film on the first thermoplastic resin film in a manner that parts of the porous membrane element is put between the first and second thermoplastic resin films; welding the first and second thermoplastic resin films to each other and to the parts of the porous membrane element to fix the parts of the porous membrane element so as to form a helical configuration; removing the helical configuration from the core member; bending the welded first and second thermoplastic film along its longitudinal center axis in a manner that the bent counterparts are brought into contact with each other so as to form a sheet-like configuration in which two layers of the parts of the porous membrane element are overlapped each other; rolling up the sheet-like configuration in the longitudinal direction of the thermoplastic film so as to form a rolled-up configuration; inserting the rolled-up configuration into a generally cylindrical casing which is thermally deformable; heating an end section of the casing while a radially inward tightening force is applied to the casing end section so as to Lightly bind the end section of the rolled-up configuration to an inner periphery of the end section of the casing; and cutting off a tip end portion of the casing end section to allow the end of each porous membrane element to open.

A still further aspect of the present invention resides in a method of producing a separation module of hollow thread-type porous membrane elements. The method comprises the following steps in the sequence set forth: arranging the hollow thread-type porous membrane elements in a planar state; putting at least one of opposite end sections of the planar state porous membrane elements between first and second elongate thermoplastic resin films to form a sheet-like configuration; heating the sheet-like configuration to weld the films to each other and to the porous membrane elements; rolling up the welded sheet-like configuration in a longitudinal direction of the first and second thermoplastic films to form a rolled-up configuration in which two layers of the porous membrane elements are spirally wound; inserting the rolled-up configuration into a generally cylindrical casing; fitting a tightening member around at least one end section of the casing to apply a radially inward tightening force to casing end section; heating at least one end section of the casing to melt the end section, in which the first and second thermoplastic resin films melt to bind the end sections of the porous membrane elements to each other and to bind the rolled-up configuration to an inner wall of the casing; and cutting off an end portion of the casing end section to allow the end of each porous membrane element to open.

A still further aspect of the present invention resides in a separation module comprising a generally cylindrical casing having opposite end sections at least one of which is reduced in its inner diameter relative to its other parts by contracting the at least one end section under heating. A plurality of hollow thread-type porous membrane elements are made of high polymer material and extend generally straight and parallel to have a high density of the porous membrane elements so as to form a bundled configuration, the bundled configuration being disposed in the casing. Thermoplastic resin is provided to bind the porous membrane elements to each other and the bundled configuration to the inner wall of the casing to maintain a fluid-tight seal among them at at least one of opposite end sections of the bundled configuration.

A still further aspect of the present invention resides in a method of producing a bundle unit of hollow thread-type porous membrane elements. The method comprises the following steps in the sequence set forth: bundling a plurality of hollow thread-type porous membrane elements made of high polymer material to form a bundled body, at least one of opposite end sections of the porous membrane elements being filled with a filler; filling thermoplastic resin powder to spaces each formed among the closed end sections of the porous membrane elements of the bundled body; fitting a tightening member around the outer peripheral surface of at least one of opposite end sections of the bundled body to apply a tightening force to reduce the outer diameter of the at least one end section of the bundled body; heating the at least one end section of the bundled body to melt the the thermoplastic resin and to tightly bind the at least one end section of the porous membrane elements under the tightening force; and removing the filler to open the at least one end sections of the porous membrane elements.

A still further aspect of the present invention resides in a method of producing a separation module of hollow thread-type porous membrane elements. The method comprises the following steps in the sequence set forth: bundling a plurality of hollow thread-type porous membrane elements made of high polymer material to form a bundled body, at least one of opposite end sections of the porous membrane elements being filled with a filler; inserting the bundled body into a generally cylindrical casing; filling thermoplastic resin powder to spaces each formed among the closed end sections of the porous membrane elements of the bundled body and to a clearance between the bundled body and the casing; fitting a tightening member around the outer peripheral surface of at least one of opposite end sections of the bundled body to apply a tightening force to reduce the outer diameter of the at least one end section of the bundled body; heating the at least one end section of the bundled body to melt the thermoplastic resin so as to tightly bind the at least one end sections of the porous membrane elements to each other and bind the bundled body and the casing under the tightening force; and removing the filler to open the at least one end sections of the porous membrane elements.

In brief, the present invention is intended to overcome the above discussed drawbacks encountered in conventional techniques by providing the special separation module using the hollow thread-type porous membrane elements, in which end sections of the bundled thread-type porous membrane elements is compulsorily reduced in diameter under heating thereby highly integrating the end sections of the respective thread-type porous membrane elements. Each thread-type porous membrane is low in solubility in a variety of solvents, and highly resistant to heat and chemicals. More specifically, the end sections of the respective thread-type porous membranes are bound to each other by using a thermally meltable or thermoplastic resin, in which the thermoplastic resin such as polyethylene or polypropylene is filled among the adjacent thread-type porous membrane elements and molten to bond the adjacent end sections of the respective thread-type porous membranes. The thermoplastic resin is used in place of adhesive in the conventional techniques. Additionally, simultaneously with the above melting of the thermoplastic resin, the end section of the bundled thread-type porous membranes is tightened by the tightening tube thereby obtaining a highly integrated configuration of the porous membrane elements. The bundled porous membrane elements are set inside the casing to obtain the separation module. Thus, according to the present invention, the highly integrated bundled membrane elements and the separation module provided with them can be obtained by a simple production process.

Additionally, by virtue of using the two thermoplastic resin films in the production method of the present invention, two layers of the hollow thread-type porous membrane elements are formed spiral and therefore the hollow thread-type porous membrane elements are uniformly dispersed thereby increasing an effective filtering area and an filtering efficiency while preventing the so-called channel phenomena encountered in the conventional techniques.

Furthermore, in case that the cylindrical casing is made of a thermally contractible plastic which is contractible under heating, the casing and the bundled porous membrane elements are sealingly secured to each other without using solvent, thereby providing the separation module which is low in solubility and highly resistant to heat and chemicals.

BRIEF DESCRIPTION OF THE DRAWINGS

In the drawings, like reference numerals designate like parts and elements throughout all figures, in which:

FIGS. 4G' to 4J' are illustrations showing a production process of a bundle unit forming part of a separation module according to the present invention;

FIGS. 7A to 7I are illustrations showing a production process of a separation module according to the present invention.

DETAILED DESCRIPTION OF THE INVENTION

Figure 1:
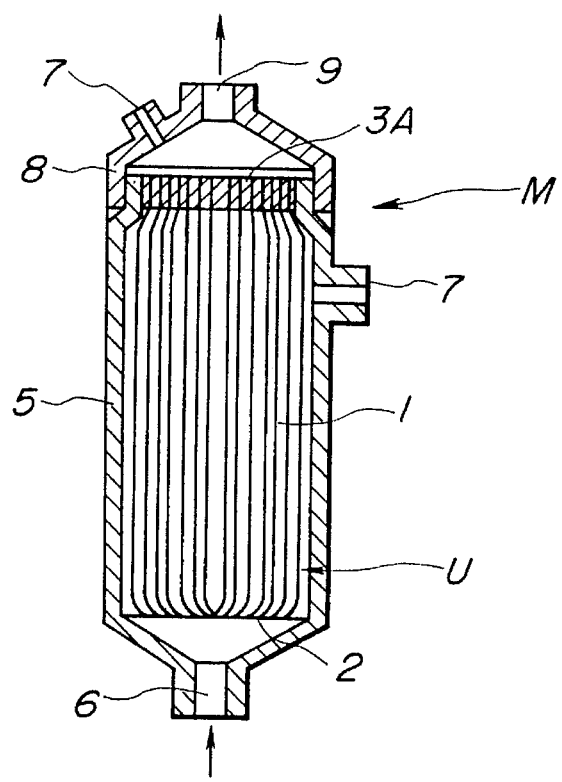
FIG. 1 is a longitudinal sectional view of a first embodiment of a separation module according to the present invention.
Figure 1A:
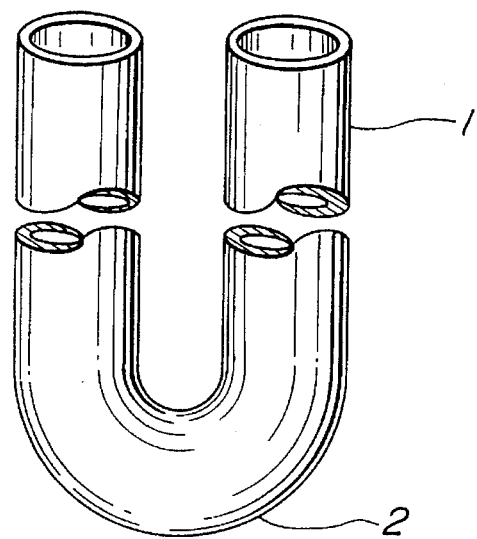
FIG. 1A is an enlarged perspective view of each of hollow thread-type porous membrane elements forming part of the separation module of FIG. 1.

Referring now to FIG. 1, a first embodiment of a separation module using hollow thread-type porous membrane elements 1, according to the present invention is illustrated by the reference numeral M. The separation module M includes a generally cylindrical casing 5 which is formed at its one end or upper end section with an inlet opening 6 through which a fluid such as liquid or gas is introduced into the casing 5. A generally cylindrical hollow thread-type porous membrane element bundle unit U is sealingly disposed in the casing 5. The porous membrane bundle element unit U includes a plurality of hollow thread-type porous membrane elements 1 each of which is made of a high polymer material and bent U-shaped having a bend end section 2 as shown in FIG. 1A. The porous membrane element 1 is in the shape of a hollow tube having micro-pores (not shown). The opposite end sections of the respective porous membrane element 1 are sealingly secured to or united with each other in a manner to allow the fluid to flow through the inside of the opposite ends of each porous membrane, thereby forming a united end section 3A of the porous membrane element bundle unit U. The united end section 3A of the porous membrane element bundle unit U is reduced in its diameter as compared with other parts of the porous membrane element bundle unit U. The united end section 3A having a reduced outer diameter is sealingly and fixedly fitted in the other end or upper end section of the casing 5, the upper end section being reduced in inner and outer diameter as compared with other parts of the casing 5. The united end section 3A of the porous membrane element bundle unit U is sealingly fixed to the casing 5. A cover 8 is fixed to the upper end section of the casing 5 under melting upon heating and formed with an air vent opening 7 and an outlet opening through which the fluid gets out of the separation module M.

With this arrangement, the fluid containing substances (solid, liquid or gas) to be separated is introduced into the casing 5 through the inlet opening 6 and passed through the micro-pores formed in the generally cylindrical wall of each porous membrane element 1. At this time, the substances to be separated cannot enter the inside of each porous membrane element 1 so as to remain at the outside of the each porous membrane element 1. The fluid which does not contain the substances enters the inside each porous membrane element 1 and flows through the united end section E1 of the porous membrane element bundle unit U and reaches the inside of the cover 8. Then, the fluid flows out of the cover 8 through the outlet opening 9.

Figure 2:
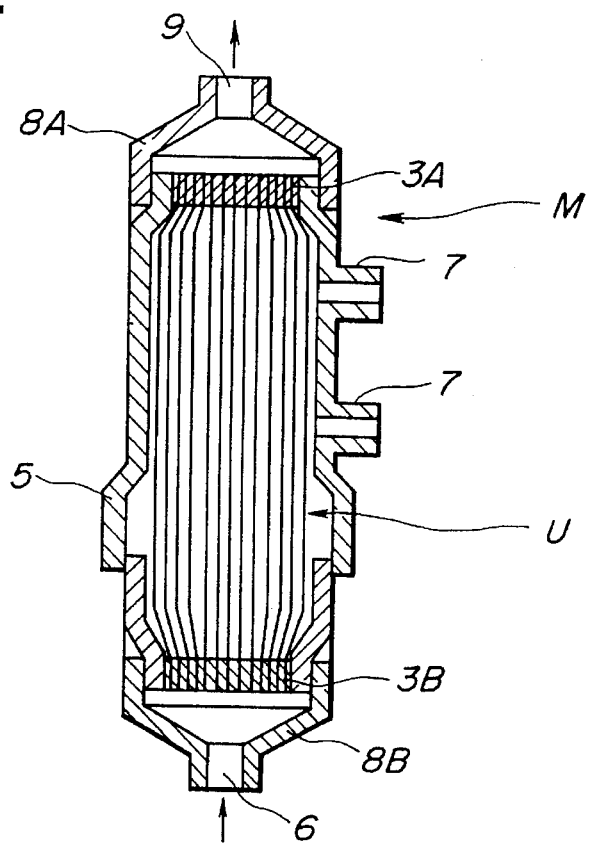
FIG. 2 is a longitudinal sectional view of a second embodiment of the separation module according to the present invention.

FIG. 2 illustrates a second embodiment of the separation module M of the present invention, similar to the first embodiment. In this embodiment, the porous membrane element bundle unit U includes a plurality of the straight hollow thread-type porous membrane elements 1 which are secured to or united with each other at their opposite end sections thereby to form a pair of opposite (or upper and lower) united end sections 3A, 3B. The united end sections 3A, 3B are both reduced in diameter as compared with other parts of the porous membrane bundle unit U. The porous membrane bundle unit U is disposed inside the casing 5 in such a manner that the upper and lower united end sections 3A, 3B are respectively fixedly fitted in the upper and lower end sections of the casing 5. The upper end lower end sections of the casing 5 are reduced in their inner and outer diameter as compared with other parts of the casing 5. Upper and lower covers 8A, 8B are sealingly fitted respectively on the upper and lower end sections of the casing 5. In this embodiment, the casing 5 includes upper and lower parts (not identified) which are independent from each other but sealingly fixed to each other.

Figure 3:
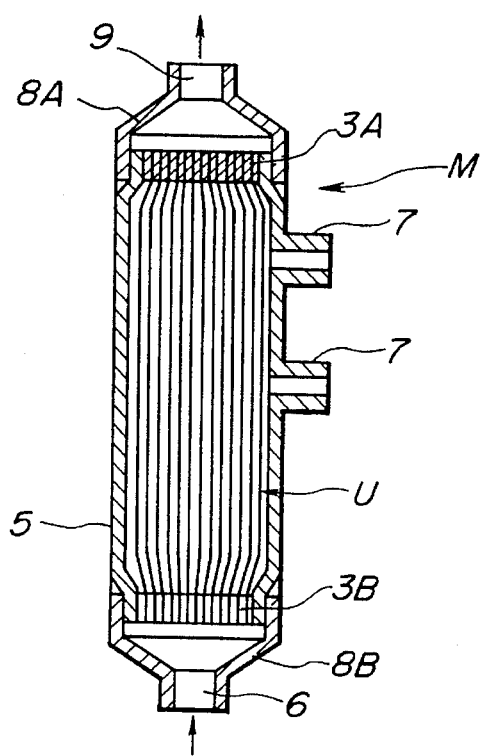
FIG. 3 is a longitudinal sectional view of a third embodiment of the separation module according to the present invention.

FIG. 3 illustrates a third embodiment of the separation module M of the present invention similar to the second embodiment with the exception that the casing 5 is of the one-piece type. The porous membrane element bundle unit U is sealingly secured and disposed inside the casing 5.

A method of producing the porous membrane element bundle unit U and the separation module M will be discussed.

First, an elongate thermoplastic resin film is put on a drum in a manner to extend along the axis of the drum. Then, the hollow thread-type porous membrane element 1 is wound spirally on the drum in such a manner that each thread-type porous membrane element 1 generally traverses the longitudinal axis of the thermoplastic resin film in plan. Thereafter, another elongate thermoplastic resin film is put on the thermoplastic resin film which has been already put, in which parts of the wound porous membrane is located between the two thermoplastic resin films. The two thermoplastic resin films are welded or bound to each other under heat, in which a part of each resin film may be molten. At this stage, the parts of the porous membrane element are fixed between the thermoplastic resin films, so that a plurality of generally U-shaped thread-type porous membranes are formed in a condition to be connected with the overlapped thermoplastic films. In other words, two layers of the parallelly arranged thread-type porous membrane elements (segments) are formed. After the hollow thread-type porous membrane element 1 is removed from the drum, the overlapped thermoplastic films are bent along the longitudinal center axis, so that the two layers of the thread-type porous membrane elements lie one upon another thereby forming a flat sheet-like configuration of the U-shaped thread-type porous membranes with the overlapped thermoplastic resin films. The thus formed flat sheet-like configuration is rolled up in the longitudinal direction of the overlapped thermoplastic resin films thereby forming a rolled-up configuration of the porous membrane elements 1.

In order to produce the porous membrane element bundle unit U, a tightening member or tube is fitted around the end section of the rolled-up configuration to clinch the end section. Then, heating is made to melt the thermoplastic resin films under a tightening force of the tightening tube thereby fixing the end sections of the respective thread-type porous membrane elements. Thereafter, a tip end part of the end section of the rolled-up configuration is cut off thus to form the thread-type porous membrane element bundle unit U.

In order to produce the separation module M, the rolled-up configuration is set inside the cylindrical casing. The tightening tube is disposed around the end section of the casing. Thereafter, the end section of the casing with the tightening tube is heated to melt the thermoplastic resin films and soften the casing end section, in which the tightening tube clinches the casing end section holding the rolled-up configuration. As a result, a liquid-tight sealing is made between the rolled-up configuration and the inner wall surface of the casing. Thereafter, the tightening tube is removed from the rolled-up configuration thus producing the separation module M.

Otherwise, after the rolled-up configuration is disposed inside the casing which is arranged such that at least one of the opposite end sections is thermally contractible, at least one of the end sections of the casing may be thermally contracted to be reduced in diameter thereby making a liquid-tight sealing between the rolled-up configuration and the inner wall surface of the casing, thus producing the separation module M. More specifically, in this case, at least one of the opposite end sections of the casing is made of a thermally contractible material which is contractible under heating. The thermally contractible material is, for example, a thermoplastic resin such as polyethylene or polypropylene and is arranged to be contractible in diameter if the material is formed annular or cylindrical. This contractible characteristics of the annular or cylindrical one results from the fact that the annular or cylindrical one has been previously expanded in diameter by receiving an external force and therefore has a restoring force so that the annular or cylindrical one is contractible in diameter under heating to tighten a member inside the inner peripheral surface of the annular or cylindrical one.

A further method of producing the porous membrane element bundle unit U and the separation module M is as follows:

A plurality of the straight hollow thread-type porous membranes are bundled, in which at least one of opposite end sections of the bundled porous membrane elements is supplied with filler so that the hollow end section of each thread-type porous membrane element is filled with the filler. Additionally, a thermoplastic resin powder as a sealing material is filled in spaces each formed among the adjacent hollow end sections of the thread-type porous membranes. After a tightening tube is fitted around the end section of the bundled porous membrane elements, heating is made on the bundled porous membrane elements so that the thermoplastic resin melts to bond the adjacent thread-type porous membrane elements. At this time, the tightening tube clinches the end section of the bundled porous membrane elements. Thereafter, the tightening tube is removed from the end section of the bundled porous membrane elements, and the filler is removed thereby making each thread-type porous membrane element hollow, thus forming the porous membrane element bundle unit. The porous membrane element bundle unit is set inside the cylindrical casing in a manner to maintain a fluid-tight seal between the and the inner wall surface of the cylindrical casing, thus producing the porous membrane element bundle unit U.

Next, a detailed explanation will be made on the production method of the hollow thread-type porous membrane bundle unit U and the separation module of the present invention.

Each hollow thread-type porous membrane element 1 as shown in FIG. 1A is made of a high polymer material such as polyolefin such as polypropylene, polyvinyl chloride, polyamide, polyester resin, polysulfone, polyether sulfone, polyetherether ketone, or fluorine-containing resin such as polyvinylidene fluoride (PVDF) or polytetrafluoro ethylene (PTFE). The thread-type porous membrane element 1 has an outer diameter not larger than 3 mm, a membrane or wall thickness not larger than 100 μm, and preferably has an outer diameter of about 0.4 mm, an inner diameter of about 0.3 mm, and a membrane thickness of around 50 μm. The hollow thread-type porous membrane element 1 in the embodiments of FIG. 1 is shown in FIG. 1A and in the shape of a hollow filtering tube having micro-pores (not shown) through which substances (solid, liquid or gas) to be separated cannot pass. The size of each pore of the porous membrane element 1 is ranging from 0.01 to 0.3 μm and, for example, 0.05 μm or 0.1 μm. The hollow thread-type porous membrane element 1 is known per se and produced, for example, by Mitsubishi Rayon Co., Ltd. in Japan.

The drum has a diameter which changes according to the size of the porous membrane element bundle unit U, in which the diameter of the drum is usually from 20 to 200 mm. The elongate plastic film is of the generally elongate rectangular shape, and has a width ranging from 10 to 50 mm and a thickness ranging from 10 to 100 μm. It is preferable that the elongate thermoplastic film is a film made of polyethylene in case that the porous membrane element 1 is made of polypropylene, a film made of polyolefin in case that the porous membrane element 1 is made of polysulfone, a film made of polyolefin in case that the porous membrane element 1 is made of polyvinylidene fluoride (PVDF), and a film made of perfluoroalkoxy alkane (PFA), perfluoro ethylene-perfluoro propylene copolymer or tetrafluoro ethylene-hexafluoro propylene copolymer (FEP) in case that the porous membrane element 1 is made of polytetrafluoro ethylene (PTFE). The elongate thermoplastic resin film is put on the drum in a manner to extend in the axial direction of the drum. The hollow thread-type porous membrane element 1 is wound on the drum with the elongate thermoplastic resin film at equal pitches or axial intervals so that the distances between the adjacent parts of the porous membrane element 1 are uniform. When winding the porous membrane element 1 has been completed, another elongate thermoplastic resin film same as the above-mentioned one is put on the above-mentioned one in a manner to overlap one upon other. Then, the two thermoplastic films are welded or bound to each other under heating, in which the thermoplastic films are partially molten. At this time, the parts of the thread-type porous membrane element 1 put between the two thermoplastic films are temporarily fixed in position thereby maintaining the equal intervals of the wound parts of the thread-type porous membrane element 1.

Thereafter, the thread-type porous membrane element 1 with the overlapped thermoplastic resin films is removed from the peripheral surface of the drum. The overlapped thermoplastic resin films are bent along the longitudinal center line or axis so that the two counterparts constituting the overlapped resin films lie one upon another. Accordingly, the two layers of the thread-type porous membrane elements lie on upon another thereby forming the flat sheet-like configuration of the U-shaped thread-type porous membrane elements 1 with the overlapped thermoplastic films. The formed flat sheet-like configuration is rolled up in the longitudinal direction of the overlapped thermoplastic resin films thereby forming a rolled-up configuration. The tightening tube is fitted around the end section of the rolled-up configuration to clinch the end section. Thereafter, the end section of the rolled-up configuration is heated to form the porous membrane element bundle unit U. By virtue of using such a production process, the thread-type porous membrane elements 1 are uniformly dispersed, preventing the thread-type porous membrane elements 1 from being locally concentrated.

Otherwise, the above-mentioned rolled-up configuration may be inserted in the cylindrical casing having the end section around which the tightening tube is fitted. Under heating, the end section of the rolled-up configuration is clinched by the tightening tube, so that the end section of the casing and the end section of the rolled-up configuration are integrated to make a fluid tight seal between them thereby forming a separation unit. The cover 8 or covers 8A, 8B are fixedly secured to the separation unit to complete the separation module M.

It is preferable that the end section of the cylindrical casing 5 is reduced in its inner diameter by using the tightening tube when the outer peripheral surface of the above-mentioned rolled-up configuration is bound to the inner peripheral surface of the casing 5. Otherwise, the end section of the cylindrical casing 5 may be reduced in its inner diameter by using the casing 5 made of the thermally contractible material which is contractible under heating. In this case, prior to binding the casing and the rolled-up configuration, the end section of the rolled-up configuration is heated at a temperature not lower than the melting point of the thermoplastic resin film, so that the end sections of the hollow thread-type porous membrane elements are bound with each other with the molten thermoplastic resin film. More specifically, the tip end section (having a length of 15 mm to 55 mm) of the casing 5 is heated at the temperature not lower than the melting point of the thermoplastic resin film by using a plate heater.

In order to reduce the diameter of the casing 5, it may be made to apply a tightening force around the end section of the casing by using a metallic mold or the like.

Under this heating, spaces among the end sections of the thread-type porous membrane elements 1 are filled with the molten thermoplastic resin. In the embodiments, the tightening member or tube has been previously disposed around the end section of the casing before the heating. Preferable examples of the tightening member or cube are a thermally contractible tube which is made of the thermally contractable material to decrease in diameter under heating, and an elastomeric tube such as a tube made of silicone rubber.

After filling the spaces among the end sections of the thread-type porous membrane elements 1, cooling is made to solidify the molten thermoplastic resin. Then, the tightening member around the end section of the casing 5 is removed, in which the end section of the casing 5 is reduced in its inner and outer diameter. The contracted tip end section (having a length of 5 to 45 mm from the extreme tip end) of the casing is cut off, so that the open ends of the hollow thread-type porous membrane elements are exposed.

Otherwise, the porous membrane bundle unit U may be formed without using the above-mentioned thermoplastic resin film as follows:

First, the spaces among the end sections of the thread-type porous membrane elements 1 are filled with the sealing material so that the end sections of the porous membrane elements 1 are fixedly bound with each other. The sealing material is made of a material which is the same as that of the hollow thread-type porous membrane element 1, or a thermoplastic resin which has a melting point lower than that of the membrane element 1 and is highly resistant to chemicals and solvents, such as polyethylene, polypropylene or polyvinyl chloride.

Figure 6:
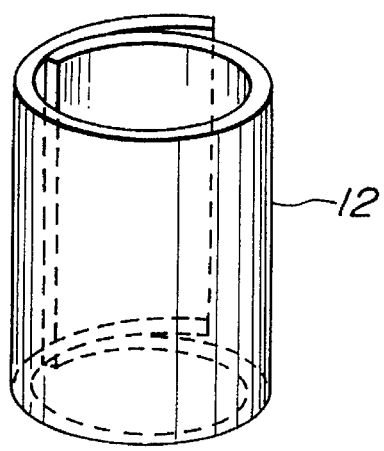
FIG. 6 is an enlarged perspective view of a plate spring as a tightening member or tube of the present invention.

As discussed above, the tightening tube is used in the production method of the present invention in order to clinch the end sections of the porous membrane elements 1 in a state the thermoplastic resin film or the sealing material is being molten under heating. Examples of the tightening tube are the thermally contractible tube, the elastomeric tube which is high in its restoring force, and a plate spring tube (shown in FIG. 6) which is made of a plate spring and formed generally cylindrical and having a spiral cross-section. The plate spring tube is preferably arranged such that its tightening force is reduced to zero when its inner diameter reduces to a predetermined value. The elastomeric tube is preferably made of silicone rubber. The tightening tube is directly disposed around the end sections of the bundled porous membrane elements 1, or disposed around the casing 5 made of the thermoplastic resin after the bundled porous membrane elements 1 are inserted in the casing 5 so that the casing can be contracted to integrate the bundled porous membrane elements 1 and the casing 5.

The tightening tube is removed after the end sections of the porous membrane elements 1 are fixedly bound to each other. However, it is unnecessary to remove the tightening tube in case the tightening tube is made of a thermally meltable material directly disposed around the end section of the bundled porous membrane elements 1 so that the thermoplastic resin film or the sealing material is thermally molten under heating. In this case, a layer of the thermally meltable material is formed on the peripheral surface of the resultant porous membrane element bundle unit U.

Next, a typical example of the production method of the separation module M of the present invention will be discussed in concrete with reference to FIGS. 4A to 4H.

Figure 4A:
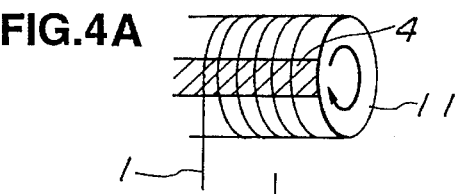
FIGS. 4A to 4K are illustrations showing a production process of a separation module according to the present invention.
Figure 4B:
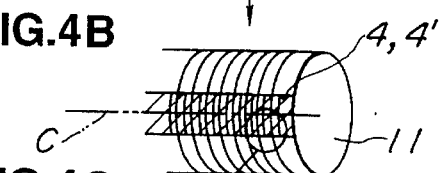
Figure 4C:
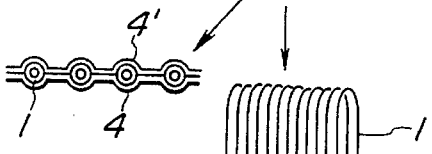

As shown in FIG. 4A, a polyethylene film (the thermoplastic resin film) 4 having dimensions of 10 to 50 mm width and 0.01 to 0.1 mm thickness is temporarily adhered onto the drum 11 having a diameter of about 50 to 100 mm. The hollow thread-type porous membrane element 1 is wound at generally equal pitches on the peripheral surface of the drum 11 with the polyethylene film 4 in a manner to be perpendicular to the longitudinal direction of the films 4, 4' in plan. Then, as shown in FIG. 4B, upon completion of winding of the porous membrane element 1, another polyethylene film 4' same as the above polyethylene film 4 is put on the polyethylene film 4 in such a manner that parts of the wound porous membrane element 1 are put between the two polyethylene films 4, 4'. In this step, the two polyethylene films 4, 4' are preferably put to be overlapped in such a manner that the parts of the wound porous membrane element 1 located around the longitudinal center line or axis C of the overlapped polyethylene films 4, 4' are permissible to be collapsed so that the fluid cannot pass through the inside of the porous membrane element 1 because the parts of the porous membrane element 1 will be cut off at a later step; however, other parts of the wound porous membrane element 1 are prevented from being collapsed. The two polyethylene films 4, 4' are molten to be welded or bound to each other under heating to form a configuration shown in FIG. 4C in which the overlapped polyethylene films 4, 4' are partly welded or bound to each ocher upon melting.

Figure 4D:
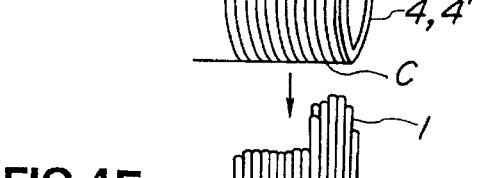
Figure 4E:
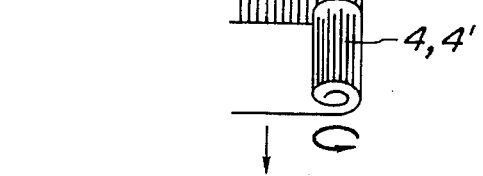
Figure 4F:
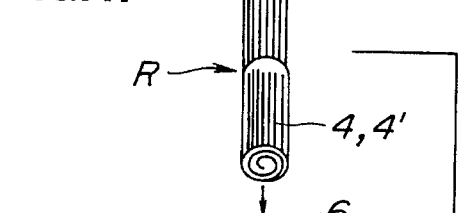

Subsequently, the drum 11 is removed to obtain a configuration shown in FIG. 4D in which a plurality of U-shaped segments of the porous membrane element 1 are connected with the overlapped polyethylene films 4, 4'. This configuration becomes a flat sheet-like configuration and rolled up as shown in FIG. 4E thereby to form a generally cylindrical rolled-up configuration R as shown in FIG. 4F. Though not shown, a cylindrical rod (not shown) made of polyolefin and having a diameter ranging 2 to 5 mm may be used as a core around which the flat sheet-like configuration is wound during the rolling-up operation of the sheet-like configuration. The cylindrical rod preferably has a melting point generally same as that of the polyethylene films 4, 4'.

The thus formed rolled-up configuration R is inserted into the casing 5 made of polyolefin as shown in FIG. 5G. In this step, the tightening tube 12 (at its radially expanded state) has been previously disposed around the casing 5 at the lower end. The tightening tube 12 is the elastomeric tube made of silicone rubber, or other tubes such as the thermally contractible tube made of PFA or EEP. It will be understood that the diameter of the lower end section of the casing 5 can be easily reduced under heating in which the polyolefin casing 5 is softened. It is preferable that the tightening tube 12 has been previously set in dimensions such that suitable dimensions can be obtained at its radially contacted state.

Figure 4G:
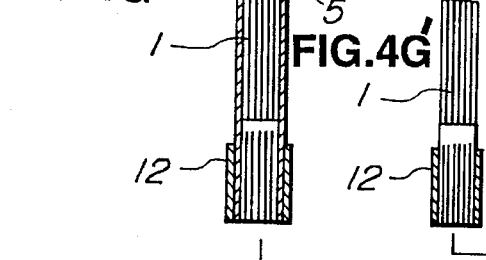
Figure 4H:
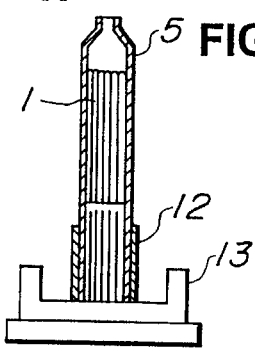
Figure 4H:
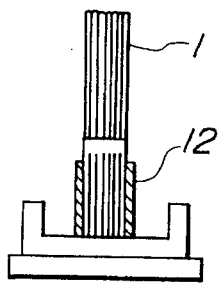
Figure 4I:
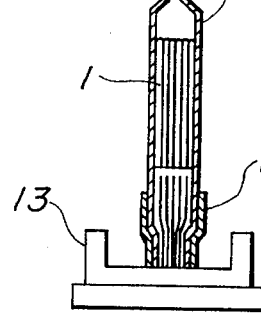
Figure 4I:
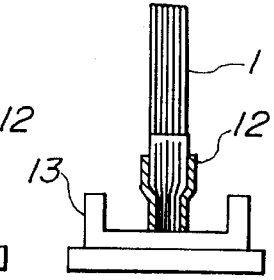
Figure 4J:
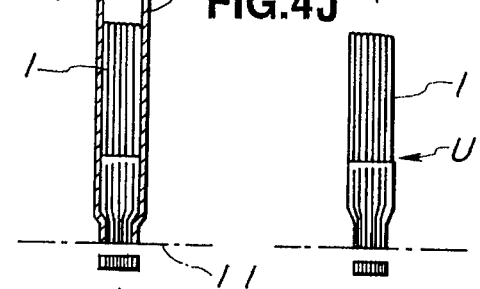
Figure 4K:
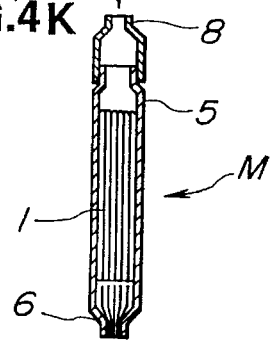
Figure 5:
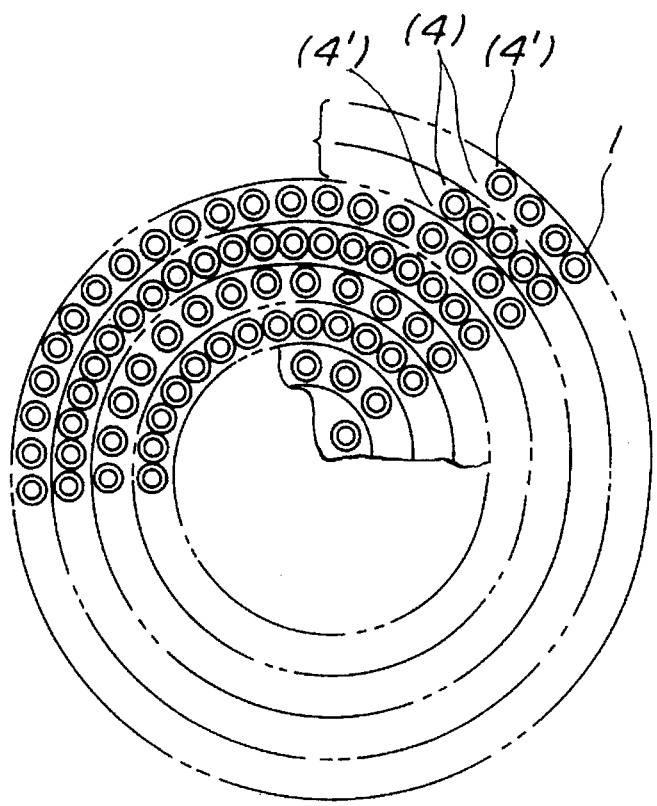
FIG. 5 is an enlarged fragmentary end view of a bundled configuration of the hollow thread-type porous membrane elements of the separation module produced by the production process of FIGS. 4A to 4K.

Thereafter, a configuration shown in FIG. 4G is put on the plate heater 13 and heated at a temperature not lower than the melting point of the polyethylene films 4, 4', so that the lower end section (having a length 15 mm to 55 mm from the tip end) is soften or partially molten as shown in FIG. 4H. As a result, the lower end section of the casing 5 is reduced in diameter as shown in FIG. 4I. During this step, the polyethylene films 4, 4' are molten thereby binding the end sections of the U-shaped segments of the porous membrane element 1. After solidification of the polyethylene films 4, 4' upon cooling, the tightening tube 12 is removed from the lower end section of the casing 5, and then the lower tip end section/having a length of 5 to 10 mm from the extreme tip end) is cut off as shown in FIG. 4J thereby to expose the open ends of the U-shaped segments of the porous membrane element 1 as shown in FIG. 5. As clearly seen in FIG. 5, in the thus produced separation module, two layers of the parallelly arranged planar thread-type porous membrane elements 1 are spirally wound so that the corresponding porous membrane elements 1, 1 at the respective two layers are accurately lie one upon another thereby regularly dispersing the porous membrane elements thus preventing the porous membrane elements from being locally concentrically located. In FIG. 5, reference numerals (4) and (4') denote the polyethylene films (now actually not exist) which exist before the step of FIG. 4H and have been molten at the step of FIG. 4H. Finally, the cover 8 made of polyolefin is fixedly attached to the cut end section as shown in FIG. 4K thus obtaining the separation module M.

In order to obtain the hollow thread-type porous membrane element bundle unit U, first the tightening tube 12 is disposed around the lower end section of the rolled-up configuration R shown in FIG. 4F, as illustrated in FIG. 4G'. Then, the lower end section (having a length of 15 to 55 mm from the extreme tip end) is heated at the temperature not lower than the melting point of the polyethylene films 4, 4' on the plate heater 13 as shown in FIG. 4H', so that the lower end section of the rolled-up configuration R is reduced in diameter as shown in FIG. 4I'. Of course, the end sections of the U-shaped segments of the porous membrane element 1 are fixedly bound to each other with the molten polyethylene films. Thereafter, the lower tip end section (having a length of 5 to 10 mm from the extreme tip end) of the rolled-up configuration R is cut off thereby exposing the open ends of the U-shaped segments of the porous membrane element 1, thus resulting the hollow thread-type porous membrane element bundle unit U. The extreme end of the bundle unit U takes the form shown in FIG. 5.

Next, another production method of the separation module M of the present invention will be discussed in detail.

First, the straight hollow thread-type porous membrane elements 1 are bundled, and then at least one of each porous membrane element 1 is filled with the filler such as calcium carbonate. Since each porous membrane element 1 is not a mere tube and formed with micro-pores, gas escapes through the micro-pores if gas is introduced into each porous membrane element 1 during heating, so that the original shape of each porous membrane element 1 cannot be maintained. In this regard, the end section of each porous membrane element is filled with the filler. It will be understood that the end section of each porous membrane element may be closed upon being unavoidably collapsed when the Lip end portion of the end section is cut off.

Consequently, the spaces among the adjacent end sections of the porous membrane elements 1 are filled with the sealing material such as the thermoplastic resin powder. Although no special method is required to fill the spaces with the sealing material, it is preferable that the end sections of the bundled porous membrane elements I are dipped in a suspension formed by suspending the sealing material in a solvent. In this case, the solvent is preferably one which can be easily dried, such as, ethyl alcohol or methyl alcohol. The suspension has not limited in concentration of the sealing material and preferably has a concentration of 50 to 70% by weight.

After the spaces are filled with the sealing material, the tightening tube is directly disposed around the end section of the bundled body of the porous membrane elements 1. Otherwise, the tightening tube may be disposed around the end section of the generally cylindrical casing after the bundled body of the porous membrane elements 1 is inserted into the casing. It is preferable that the tightening tube 12 has been previously set in dimensions such that suitable dimensions can be obtained at its radially contacted state.

Thereafter, the end section (provided with the tightening tube) of the bundles body or the casing is heated by the plate heater. During heating, the sealing material is molten to bind the end sections of the bundled porous membrane elements 1, in which clearances among the adjacent thermoplastic resin powder particles (as the sealing material) are filled under the contracking force of the tightening tube or the thermally contractible tube, thus improving the reliability and durability of a fluid-tight seal formed amount the adjacent porous membrane elements 1. The above heating may be carried out by putting the whole configuration including all the porous membrane elements 1 in a heating furnace which can keep a predetermined constant temperature, in place of heating a part of the same configuration.

In case that the bundled body of the porous membrane elements 1 with the tightening cube are heated as mentioned above, the porous membrane element bundle unit U is obtained. This bundle unit U may be used by being disposed inside the casing through a packing or seal between the casing and the bundled body, or by being disposed after a thermoplastic resin film is wound around the bundle unit U and by being heated to melt the resin film so as to make a seal between the casing and the bundle unit U, as occasion demands.

It will be understood that it is unnecessary to remove the tightening tube in case the tightening tube is made of a thermally meltable material directly disposed around the end section of the bundled porous membrane elements 1, and in case that the thermoplastic resin or the sealing material is thermally molten under heating. In this case, a layer of the thermally meltable material is formed on the peripheral surface of the resultant porous membrane element bundle unit U.

After completion of the porous membrane element bundle unit U, the tip end section of the bundle unit U is cut off perpendicularly to the axis of the bundle unit U, or the filler is removed, thus exposing the open ends of the porous membrane elements 1. The same process as mentioned above may be accomplished to the other end section of the bundled body of the porous membrane elements 1, thus resulting in the porous membrane element bundle unit U which has the opposite end sections at which porous membrane elements 1 are bound to each other.

Otherwise, the bundled body of the porous membrane elements 1 with the sealing material may be inserted into the casing before heating. In this case, the tightening tube is disposed around the casing in which the bundled body of the porous membrane elements 1 is disposed. Then, the end section of the casing with the bundled body is heated to melt the above-mentioned sealing member and the thermoplastic resin casing under the tightening force of the tightening tube. Thereafter, the open ends of the porous membrane elements 1 are exposed by removing the filler or cutting off the tip end section of the cover containing the bundled body of the porous membrane elements 1, thus resulting in the separation module M.

Another typical example of the above-discussed production method of the separation module will be explained with reference to FIGS. 7A to 7I.

First, a container is supplied with a suitable amount of fine powder of polyolefin resin 4A (the sealing material) such as polypropylene, polyethylene or ethylene-vinyl acetate copolymer. Then, a dispersion medium such as ethanol is added into the container to form a high concentration dispersion liquid as shown in FIG. 7A. On the other hand, the hollow thread-type porous membrane elements 1 are bent generally U-shaped and bundled, and inserted into the cylindrical casing or tube 5 made of polyolefin in such a manner that tip end sections (having a length of 30 to 80 mm) project from the lower end of the casing 5, as shown in FIG. 7B. In this example, the tip end of each porous membrane element 1 is collapsed to be closed thereby preventing the high concentration dispersion liquid from being entering the porous membrane elements 1.

Subsequently, the end sections of the bundled porous membrane elements 1 projecting from the casing lower end are unfurled to be separate from each other, and dipped in the high concentration dispersion liquid so that the projected end section of each porous membrane element 1 is sufficiently coated with the high concentration dispersion liquid, as shown in FIG. 7C. Thereafter, the projected end sections of the bundled porous membrane elements 1 are withdrawn into the casing 5 to form an encased unit as shown in FIG. 7D. This encased unit is heated at a temperature lower than the melting point of the polyolefine resin thereby evaporating ethanol as the dispersion medium as shown in FIG. 7E. As a result, the polyolefin resin is filled in spaces each formed among the adjacent end sections of the porous membrane elements 1 as shown in FIG. 7E in which the phantom line 11 indicates a level at which cutting is made after solidification of the polyolefin resin.

After being dried, the heated encased unit is supplied with the tightening tube (made of, for example, silicone rubber, PFA, FEP or the thermally contractible material) in such a manner that the tube is fitted on the lower end section of the casing 5, and then put on the plate heater or heater block 13 to heat the end section of the encased unit at a temperature higher than the melting point of the polyolefin resin (the sealing material) thereby to melt the sealing material 4A, as shown in FIG. 7F. During this step, the end section of the casing 5 made of polyolefin resin is contracted to reduce in diameter under the action of the tightening tube 12, simultaneously with the melting of the sealing material 4 as shown in FIG. 7G. It will be understood that, in case of using the tube made of the thermally contractible material), the material is selected to obtain a necessary contract amount, taking account of the inner and outer diameters of the casing made of polyolefin resin and the number of the hollow thread-type porous membrane elements 1 constituting the bundle body of the porous membrane elements 1.

After completion of binding the end sections of the porous membrane elements 1 to each other upon solidification of the sealing material 4 under cooling, the tightening tube 12 is removed from the casing 5, thereby obtaining the encased unit whose end section is reduced in diameter. Then, the tip end portion (having a length of 5 to 10 mm) of the encased unit is cut off along the above-mentioned level 11 as shown in FIG. 7H, in which the open ends of the hollow thread-type porous membrane elements 1 are exposed so that fluid can flow through the inside of the end section of each porous membrane element 1. Thereafter, the cover 8 made of polyolefin resin is fixedly installed to the end section of the casing 5 under partially melting of them upon heating, thus obtaining the separation unit U.

Figure 8A:
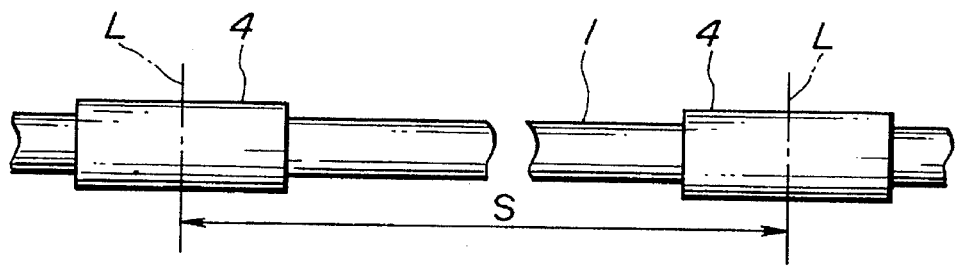
FIGS. 8A to 8D are illustrations showing a production process of a bundled body of the hollow thread-type porous membrane elements, forming part of the separation unit according to the present invention.
Figure 8B:
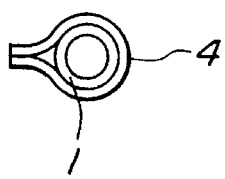
Figure 8C:
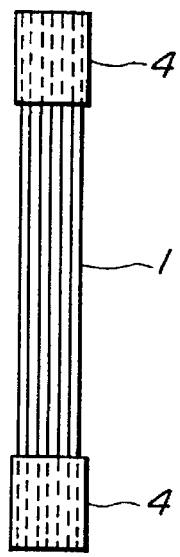
Figure 8D:
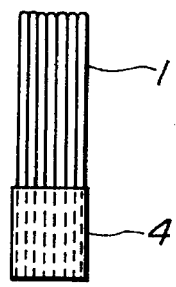

A bundled configuration of the porous membrane elements 1 similar to that enclosed in the casing 5 in FIG. 7F may be otherwise produced as shown in FIGS. 8A to 8D and as follows: First, short pipe-like thermoplastic resin films 4 are put at predetermined intervals on the porous membrane element in line as shown in FIGS. 8A and 8B, and cut at cutting lines indicated by L in FIG. 8A to form a plurality of linear segment members S. The linear segment members S are then bundled as shown in FIG. 8C. Finally, the bundled linear segment members S are bent at their longitudinal center thereby obtaining the bundled configuration as shown in FIG. 8D. It will be understood that the shore pipe-like thermoplastic resin film 4A may be replaced with other members made of thermoplastic resin.

What is claimed is:

1. A bundle unit of hollow porous membrane elements, comprising:

a plurality of hollow porous elements made of high polymer material and extending generally straight and parallel so as to form a bundled configuration, said bundled configuration including two end sections which are oppositely disposed; and means for binding the end sections of said porous membrane elements to each other at at least one of said opposite end sections of the bundled configuration to obtain a fluid-tight seal of the at least one end section;

said bundled unit being produced by arranging said hollow porous membrane elements in a planar state, putting at least one of said opposite end sections of said planar state porous membrane elements between first and second elongate thermoplastic resin films to form a sheet configuration, said thermoplastic resin films constituting said binding means, heating said sheet configuration to weld said films to each other and to said porous membrane elements, rolling up said welded sheet configuration in a longitudinal direction of said first and second thermoplastic films to form a rolled-up configuration including layers of said porous membrane elements which are spirally wound, each layer being planar and including porous membrane elements which are in parallel arrangement, and melting said first and second thermoplastic resin films to bind the end sections of said porous membrane elements to each other.

2. A bundle unit as claimed in claim 1, wherein said hollow porous membrane element is generally cylindrical and has micro-pores through which fluid passes.

3. A bundle unit as claimed in claim 2, wherein said micropores have a size ranging from 0.01 to 0.3 μm.

4. A bundle unit as claimed in claim 1, wherein said hollow porous membrane element is made of a material selected from the group consisting of polypropylene, polyvinyl chloride, polyamide, polyester resin, polysulfone, polyethersulfone, polyetherether ketone, polyvinylidene fluoride (PVDF), and polytetrafluoro ethylene (PTFE).

5. A bundle unit as claimed in claim 1, wherein said hollow porous membrane element has an outer diameter not larger than 3 mm and a thickness not larger than 100 μm.

6. A bundle unit as claimed in claim 1, wherein each thermoplastic resin film is made of a material selected from the group consisting of polyethylene, polypropylene, polyolefin, perfluoroalkoxy alkane (PFA), perfluoro ethylene-perfluoro propylene copolymer, and tetrafluoro ethylene-hexafluoro propylene copolymer (FEP).

7. A separation module comprising:

a generally cylindrical casing;

a plurality of hollow porous membrane elements made of high polymer material and extending generally straight and parallel so as to form a bundled configuration said bundled configuration including two end sections which are oppositely disposed, said bundled configuration being disposed in said casing; and means for binding the end sections of said porous membrane elements to each other at at least one of opposite end sections of the bundled configuration to obtain a fluid-tight seal of the at least one end section;

said separation module being produced by arranging said hollow porous membrane elements in a planar state, putting at least one end section of said planar state porous membrane elements between first and second elongate thermoplastic resin films to form a sheet configuration, heating said sheet configuration to weld said films to each other and/or to said porous membrane elements, rolling up said welded sheet configuration in a longitudinal direction of said first and second thermoplastic films to form a rolled-up configuration including layers of said porous membrane elements which are spirally wound, each layer being planar and including porous membrane elements which are in parallel arrangement, inserting said rolled-up configuration into said casing, and melting said first and second thermoplastic resin films to bind the end sections of said porous membrane elements to each other and to an inner wall of said casing.

8. A separation module as claimed in claim 7, wherein said casing is made of a thermoplastic resin so that the at least one end section of said casing is reduced in diameter.

9. A separation module as claimed in claim 7, wherein the at least one end section of said casing is reduced in diameter.

10. A method for producing a bundle unit of hollow porous membrane elements, comprising;

setting at least one first elongate thermoplastic resin film on a core member;

winding spirally said hollow porous membrane element on said core member in a manner to be generally perpendicular to the longitudinal axis of the first elongate thermoplastic resin film;

providing at least one second elongate thermoplastic resin film on said first thermoplastic resin film in a manner that at least part of said porous membrane element is oriented between said first and second thermoplastic resin films;

welding said first and second thermoplastic resin films to each other and to the part of said porous membrane element to form a helical configuration;

removing said helical configuration from said core member;

bending said welded first and second thermoplastic film along its longitudinal center axis so as to form a sheet configuration such that two layers of the porous membrane element are formed which are overlapped;

rolling up said sheet configuration in the longitudinal direction of the thermoplastic film so as to form a rolled-up configuration;

fitting a tightening member around an end section of said rolled-up configuration to apply a tightening force to the end section;

heating the end section of said rolled-up configuration to melt it, in which the end section is tightened by said tightening member so as to tightly bind end portions of the parts of the porous membrane element to each other; and cutting off a tip end portion of said rolled-up configuration.

11. A method for producing a separation module of hollow porous membrane elements, comprising:

setting at least one first elongate thermoplastic resin film on a core member;

winding spirally a hollow porous membrane element on said core member in a manner to be generally perpendicular to the longitudinal axis of the first elongate thermoplastic resin film;

providing a second elongate thermoplastic resin film on said first thermoplastic resin film in a manner that at least part of said porous membrane element is oriented between said first and second thermoplastic resin films;

welding said first and second thermoplastic resin films to each other and to the part of said porous membrane element so as to form a helical configuration;

removing said helical configuration from said core member;

bending said welded first and second thermoplastic film along its longitudinal center axis so as to form a sheet configuration in which two layers of the porous membrane element are overlapped each other;

rolling up said sheet configuration in the longitudinal direction of the thermoplastic film so as to form a rolled-up configuration;

inserting said rolled-up configuration into a generally cylindrical casing which is thermally deformable;

heating an end section of said casing while a radially inward tightening force is applied to the casing end section so as to tightly bind the end section of said rolled-up configuration to an inner periphery of the end section of said casing; and cutting off a tip end portion of said casing end section to allow the end of each porous membrane element to open.

12. A method as claimed in claim 11, wherein the end section of said casing is made of a thermally contractable material and has been previously enlarged in diameter under a radially external force applied to the casing end section.

13. A method of producing a separation module of hollow porous membrane elements, comprising:

arranging said hollow porous membrane elements having opposite end sections in a planar state;

putting at least one of opposite end sections of said planar state porous membrane elements between first and second elongate thermoplastic resin films to form a sheet configuration;

heating said sheet configuration to weld said films to each other and to said porous membrane elements;

rolling up said welded sheet configuration in a longitudinal direction of said first and second thermoplastic films to form a rolled-up configuration including layers of said porous membrane elements which are spirally wound;

inserting said rolled-up configuration into a generally cylindrical casing;

fitting a tightening member around at least one end section of said casing to apply a radially inward tightening force to casing end section;

heating at least one end section of said casing to melt the end section, in which said first and second thermoplastic resin films melt to bind the end sections of said porous membrane elements to each other and to bind the rolled-up configuration to an inner wall of said casing; and cutting off an end portion of said casing end section to allow the end of each porous membrane element to open.

14. A method for producing a bundle unit of hollow porous membrane elements, comprising:

providing at least one first elongate thermoplastic resin film on a core member;

spirally winding a hollow porous membrane element on said core member to form a helical configuration;

providing at least one second elongate thermoplastic resin film on said first thermoplastic resin film such that said a part of said porous membrane element is oriented between said first and second thermoplastic resin films;

welding said first and second thermoplastic resin films to each other and to the porous membrane element;

removing said core member;

bending said welded first and second thermoplastic film along its longitudinal center axis so that said welded first and second thermoplastic film and helical membrane element forms a sheet configuration;

rolling up said sheet configuration in the longitudinal direction of the thermoplastic film.

15. A method of producing a bundle unit of hollow porous membrane elements, comprising arranging said hollow porous membrane elements in a planar configuration, each of said membrane elements having two opposite end sections and said membrane elements being in parallel orientation with respect to each other, said planar configuration having two opposite end sections;

placing at least one of said opposite end sections of said planar configuration between a first and a second elongate thermoplastic resin films to form a sheet configuration;

heating said sheet configuration to weld said films to each other and to said porous membrane;

rolling up said welded sheet configuration in a longitudinal direction with respect to said first and second thermoplastic films to form a rolled-up configuration including layers of said porous membrane elements which are spirally wound, each layer being planar and including porous membrane elements which are in parallel arrangement; and melting said first and second thermoplastic resin films to bind the end sections of said porous membrane elements to each other.

16. A method of producing a separation module of hollow porous membrane elements comprising:

arranging said hollow porous membrane elements in a planar configuration, each of said membrane elements having two opposite ends, and said membrane elements being in parallel orientation with respect to each other, said planar configuration having two opposite end sections;

placing at least one end of said planar configuration between a first and a second elongate thermoplastic resin films to form a sheet configuration;

heating said sheet configuration to weld said films to each other and/or to said porous membrane elements, rolling up said welded sheet configuration in a longitudinal direction with respect to said first and second thermoplastic films to form a rolled-up configuration including layers of said porous membrane elements which are spirally wound, each layer being planar and including porous membrane elements which are in parallel arrangement;

inserting said rolled-up configuration into a casing; and melting said first and second thermoplastic resin films to bind the end sections of said porous membrane elements to each other and to an inner wall of said casing.

* * * * *